United States Patent
Bleikolm et al.

(10) Patent No.: US 6,521,036 B1
(45) Date of Patent: Feb. 18, 2003

(54) OPTICALLY VARIABLE PIGMENTS PROVIDING A COLOR SHIFT BETWEEN TWO DISTINCT COLORS, COATING COMPOSITION COMPRISING THE SAME, METHOD FOR PRODUCING THE SAME AND SUBSTRATE COATED WITH THE COATING COMPOSITION

(75) Inventors: Anton Bleikolm, Ecublens (CH); Olivier Rozumek, St. Martin (CH); Edgar Muller, Lausanne (CH)

(73) Assignee: SICPA Holding S.A., Prilly (CH)

( * ) Notice: Subject to any disclaimer, the term of this patent is extended or adjusted under 35 U.S.C. 154(b) by 0 days.

(21) Appl. No.: 09/743,791

(22) PCT Filed: Jul. 30, 1999

(86) PCT No.: PCT/EP99/05454
§ 371 (c)(1),
(2), (4) Date: Feb. 20, 2001

(87) PCT Pub. No.: WO00/12634
PCT Pub. Date: Mar. 9, 2000

(30) Foreign Application Priority Data

Aug. 31, 1998 (EP) .............................. 98810860
Dec. 21, 1998 (EP) .............................. 98811248

(51) Int. Cl.$^7$ ................ C09C 1/62; C09C 1/64

(52) U.S. Cl. ................ 106/404; 106/402; 106/403; 106/415; 428/402; 428/403; 428/404; 428/42

(58) Field of Search ................ 106/402, 403, 106/404, 415; 428/402, 403, 404, 42

(56) References Cited

U.S. PATENT DOCUMENTS 5,059,245 A * 10/1991 Phillips et al. ................ 106/20
5,607,504 A * 3/1997 Schmidt et al. ............. 106/403
5,763,086 A * 6/1998 Schmid et al. .............. 428/404

FOREIGN PATENT DOCUMENTS

WO      WO 95/17474      *  6/1995  ............. C09C/1/00

* cited by examiner

Primary Examiner—Mark L. Bell
Assistant Examiner—Shalie A. Manlove
(74) Attorney, Agent, or Firm—Shoemaker and Mattare

(57) ABSTRACT

The invention relates to optically variable pigments (10) having a color shift between two distinct colours of any of the known designs. The pigments having incorporated a totally reflecting layer made by physical vapour deposition from aluminum alloy (11). This pigment exhibits excellent chromaticity, corrosion resistance, particularly in any kind of coating composition or printing ink and especially when water is present.

26 Claims, 1 Drawing Sheet

Figure 1:
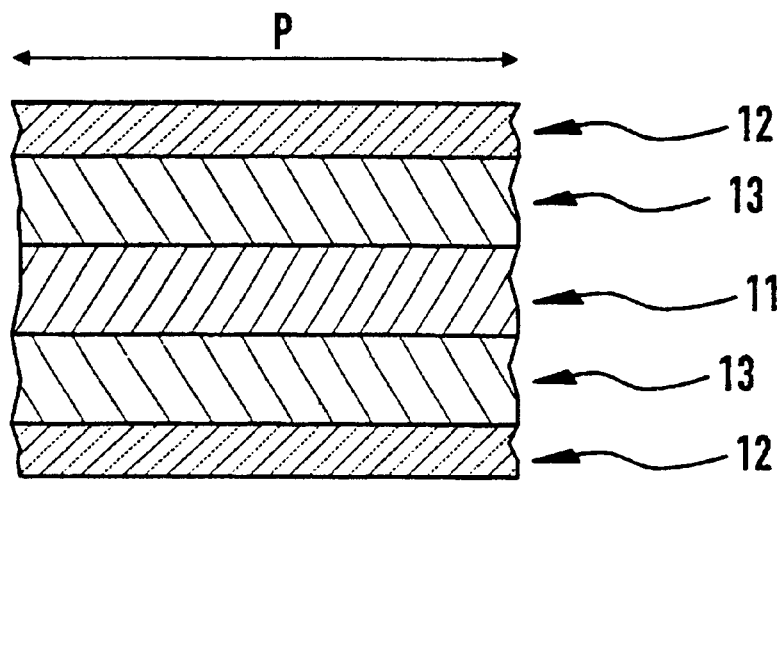

OPTICALLY VARIABLE PIGMENTS PROVIDING A COLOR SHIFT BETWEEN TWO DISTINCT COLORS, COATING COMPOSITION COMPRISING THE SAME, METHOD FOR PRODUCING THE SAME AND SUBSTRATE COATED WITH THE COATING COMPOSITION

The invention relates to optically variable pigments providing a color shift between two distinct colours, to methods for producing the pigments, to an optically variable coating composition comprising such pigments and to a method for producing indica comprising such pigments according to the preamble of the independent claims.

Optically variable pigments having a color shift between two distinct colours with the color shift being dependent on the viewing angle, are well known. Throughout this specification the expression "optically variable" stands for such a type of optical characteristic. The production of these pigments, their use and their characteristic features, are described in various publications and patents, e.g. L. Schmidt, N. Mronga, W.Radtke, O. Seeger, "Lustre pigments with optically variable properties", European Coatings Journal 7–8/1997, patents U.S. Pat. No. 4,434,010, U.S. Pat. No. 5,059,245, U.S. Pat. No. 5,084,351, U.S. Pat. No. 5,135,812, U.S. Pat. No. 5,171,363, U.S. Pat. No. 5,571,624, EP 0341002, EP 0736073, EP 668 329 and EP 0 741 170.

Optically variable pigments having a viewing angle dependent shift of color are based on a stack of superposed thin-film layers with different optical characteristics. The hue, the amount of color-shifting and the chromaticity of such thin-film structures depend among others on the material constituting the layers, the sequence and the number of layers, the layer thickness as well as on the production process.

Generally, optically variable pigments comprise an opaque, totally reflecting layer, a dielectric layer of a low refractive index material, i.e. with an index of refraction of 1.65 or less, deposited on top of the opaque, totally reflecting layer and a semi-transparent, partially reflecting layer applied on the dielectric layer.

The combination of a dielectric layer and a semi-transparent partially reflecting layer may be regarded as a sequence which can be repeatedly applied.

Throughout this specification the terms opaque, totally and partially-reflecting, semi-transparent and transparent relate to electromagnetic radiation in the visible range of the electromagnetic spectrum, i.e. from approximately 400 to 700 nm.

The semi-transparent, partially reflecting layer can be made of metals (aluminum, chromium) or of high-refractive materials, e.g. certain metal-oxides or metal-sulphides ($MoS_2$, $Fe_2O_3$ etc). Preferred materials for the dielectric layer are $SiO_2$ and $MgF_2$. Usually the thickness of the semi-transparent, partially reflecting layer is between 5 and 25 nm, whereas the thickness of the dielectric layer depends on the colours desired. Typically it is in the range of between 200 and 500 nm. The opaque, totally reflecting layer is preferably of aluminum. Gold, copper, silver, and cobalt-nickel alloys have been alternatively proposed as materials for the opaque, totally reflecting layer. Generally, the degree of opaqueness is a function of the layer thickness. Aluminum becomes opaque at approximately 35–40 nm thickness. Therefore, a typical range of the thickness of the totally reflecting aluminum layer is between 50–150 nm.

Optically variable pigments can be produced by a number of different processes; two of them have gained major importance. In the first of them a continuous sheet of an optically variable thin-film structure is produced and ground to pigments, in the second, suitable precursor particles, e.g. Aluminum flakes, are coated with an optically variable thin-film structure.

In the first type of production process, the various layers are deposited successively on top of each other by physical vapor deposition processes to form a continuous sheet of a multilayer thin-film stack onto a flexible carrier. The carrier is preferably a web of a PET or similar polymer foil.

The resultant multilayer thin-film structure comprises an opaque, totally reflecting layer with first and second surfaces, a dielectric layer deposited on top of the opaque, totally reflecting layer and a semi-transparent, partially reflecting layer applied on top of the dielectric layer. The sequence dielectric layer/partially reflecting layer may be present either on one side of the opaque, totally reflecting layer or on both of its sides. The latter case can result in a symmetric multilayer stack, i.e. in a symmetric structure of the optically variable pigment, assumed the optical properties on both sides are chosen to be the same. To obtain the final pigment the resulting multilayer thin-film sheet is detached and comminuted to the desired pigment size by known methods of grinding.

Any suitable physical vapor deposition (PVD) technique used for the production of thin-films can be applied for the production of this type of optically variable pigments. Such techniques are described in Ullmann's Encyclopedia of Industrial Chemistry, 5th edition, Verlag Chemie, Weinheim, Germany, Volume A VI, page 67 ff. and in Milton Ohring "The Materials Science of Thin Films", Academic Press Inc., 1992; they take essentially place under high vacuum conditions.

Producing the superposed layers by physical vapor deposition results in smooth and substantially plane and parallel layers which render possible a high chromaticity of the pigment as a consequence of parallel reflected electromagnetic radiation.

Furthermore due to the absence of oxygen during the production process a potential formation of oxide layers on the metal surfaces is prevented. This is important since in presence of oxygen the surface of many metals are attacked and a thin oxide layer spontaneously is formed on the exposed surfaces. However, already a thin oxide layer can perturb the reflectivity of those metal layers which constitute the opaque, totally reflecting layer.

Grinding of the multilayer thin-film sheet to pigment particles of the desired size results in substantially flat pigments, i.e. flakes, with irregularly broken edges. At these edges, perpendicular to the plane of the layers which form the stack, the opaque totally reflecting central layer is not longer protected by the superposed dielectric layer. Moreover, the mechanical stress exerted onto the pigment during the grinding process can result in hairline cracks in the dielectric layers. As a consequence, corrosion of the inner layers of the multilayer stack may take place at multiple sites upon contact with suitable chemical reagents. Such reagents are omnipresent, as e.g. in printing ink formulations (resins, solvents, etc.), or simply stem from the environment acting on the printed inks (sweat, laundry, etc.).

In the context of the present invention the term corrosion stands for the reaction of a metal material with the environment which results in a measurable change of the material or which leads to a deterioration of the function of a metallic surface or layer of the complete system. This definition is according to DIN 50900 Tl.1 April 1982, Tl.2 January 1984 and Tl.3. September 1985.

With respect to the optically variable pigments corrosion of the metals constituting some of the layers results in a measurable change of the optical properties of that pigment. The change may go from a weakening of chromaticity to a complete deterioration (loss) of the color properties of that pigment. The by-product of the corrosion can contribute substantially to the observed optical changes.

Aluminum, with a reflectivity of about 99% over the whole spectral domain of interest, represents a quite ideal choice from the optical point of view.

However, corrosion of aluminum generally occurs with water, acids or bases, as well as with strong complex forming agents or simply in the presence of oxygen. This is due to the strongly electropositive nature of aluminium, which has a standard potential of −1.70 V against hydrogen. Thus, in contact with water or oxygen, aluminium spontaneously form a very thin aluminium oxide layer which however completely protects the underlying metal from further attack. Therefore, corrosion of a clean aluminium surface in air or water self-stops immediately. However any chemical reagent able to dissolve this protecting layer of the aluminium oxide will permit ongoing corrosion of the underlying metal which will go on as long as the protecting layer is removed. This is the case with acids (formation of soluble $Al^{3+}$ salts), with hydroxide (formation of the $[Al(OH)_4]^{3-}$ anion), and with organic complex forming agents (EDTA, NTA, etc.) which fix the $Al^{3+}$ ion in the form of soluble complexes). Mercury salts, too, have the property of destroying the protective layer on aluminium and therefore induce rapid corrosion.

It is therefore evident that the reflecting layer in the multilayer structure of said optically variable pigments will rapidly be destroyed in the presence of the mentioned chemicals. In addition, the corrosion of aluminium will produce hydrogen gas, which "blows up" the pigments until they finally burst.

Other, less corrosive metals were proposed as a substitute for aluminium, however, they show other serious drawbacks, as e.g. considerable trade-off in reflectivity. Silver still has a relatively good reflectivity (about 99% of the incident light between 400 nm and 700 nm) and does not corrode with water. However, its tendency to react with all kind of sulphur compounds to form black $Ag_2S$ is notorious, and sulphur compounds are omnipresent in the environment. Silver-based optically variable pigments tend thus to deteriorate as well with time.

Gold, which is a rather non-corroding metal (except in the presence of $O_2/Cl^-$ or $O_2/CN^-$), has a reduced spectral range of reflectivity in the visible domain (500 nm to 700 nm) and is furthermore far too expensive.

Nickel and cobalt-nickel alloys are substantially resistant to corrosion, but they have a relatively small reflectivity, i.e. only about 50% in the visible spectral domain, which results in a reduced chromaticity of the optically variable pigments.

Due to the chemical reactivity, any optically variable pigment manufactured by the first process and comprising aluminium as the opaque totally reflecting layer, is instable in coating compositions or printing inks. The reaction between the metal and the corrosive components which are present in the surrounding medium commences with the unprotected metal surface at the broken edges or in defects of the covering layers. Corrosion advances across the metal layer by the aggressive components entering the hairline cracks.

A second type of production process results in a different design of optically variable pigments. The process is realized by providing commercially available, prefabricated totally reflecting platelets which are coated all around with at least one dielectric layer and at least one semi-transparent, partially reflecting layer. These layers are deposited preferably by chemical vapour deposition processes or by coating methods of the wet chemical type, as described e.g. in the Schmidt reference. In this process too, the sequence of dielectric and partially-reflecting layers can be repeatedly applied. Pigments of this type are described e.g. in EP 668 329 and EP 0741 170.

The opaque totally reflecting platelets used as precursors in this second process are the result of rather coarse mechanical operations like grinding, hammering, rolling, etc. of suitable pieces of whatever form. As such they do not represent optically flat surfaces.

As a consequence of this treatment, diffuse reflection is present in a substantially amount, i.e. incident radiation is reflected in all directions. Thus the chromaticity of the pigments is low. As a preferred precursor material platelets made from aluminium are disclosed steel, copper, copper alloys and aluminium alloys are suitable, too.

Since the subsequent deposition of dielectric and semi-transparent, partially reflecting layers in this second process is made by chemical vapour deposition or by reaction of the wet chemical type, the platelets have to be passivated against corrosion and particularly against the reaction with water. As already described, additional protective coatings and/or passivating layers are likely to weaken reflectivity and thus have a detrimental effect on chromaticity.

One advantage, however, of the optically variable pigment made by chemical vapour deposition or by reactions of the wet-chemical type is, that the central opaque, totally reflecting platelet is completely surrounded and thus protected by the subsequent dielectric and further layers. Corrosion in aggressive media is thus less likely to take place as with the sheet-type optically variable pigment produced by the first process. But even if corrosion in this type of pigment is more likely not to take place, there are nevertheless conditions, where this coating will break up or fissure, especially when heat is applied. Aluminium metal has a much higher thermal expansion coefficient than the coating materials applied around it; this will produce hairline cracks in the coating when heated. In consequence, hot industrial laundry will be able to attack even all-around coated aluminium particles. If corrosion is free to go on, hydrogen gas will evolve, and finally the particles will burst into pieces.

An economically sensible combination of physical and chemical vapor deposition processes for the production of optically variable pigments possessing the positive characteristics of both processes has been failed in the past. Aluminium sheets produced by physical vapor deposition corrode during any transfer or grinding operation or during the deposition by means of chemical vapor deposition techniques or wet chemical reactions.

It is therefore an object of the present invention to enhance the corrosion resistance of optically variable pigments whilst maintaining a good chromaticity.

It is a further object of the present invention to enhance the corrosion resistance of optically variable pigments which are produced by physical vapor deposition as the sole deposition technique.

It is a further object of the present invention to enhance the corrosion resistance of the opaque, totally reflecting metal layer without lowering its reflectivity.

It is a further object of the invention to produce corrosion-resistant optically variable pigments with a chromaticity comparable to the pigments having the totally reflecting layer made from pure aluminium metal.

It is an object of the present invention to combine physical vapor deposition technology and chemical vapor deposition technology and/or reaction of the wet chemical type for the production of optically variable pigments.

It is another object to produce optically variable pigments having a color shift between two distinct colours which can be incorporated in water based coating compositions particularly printing inks.

These objects are solved according to the features of the independent claims. Particularly, they are solved by the use of at least one opaque, totally reflecting layer which is made from corrosion-resistant aluminium alloy by physical vapor deposition.

The corrosion-resistant layers made from aluminium alloy and which are produced by physical vapor deposition may be applied for all designs of optically variable pigments having a color shift between two distinct colours.

Aluminium alloys are described e.g. by G. Wassermann, in Ullmann's Encyclopedia of Industrial Chemistry, $4^{th}$ edition Verlag Chemie, Weinheim Germany, Volume 7, page 281–292.

Compared to pure aluminium, there are many aluminium alloys which have higher strength, better workability, lower melting points and which are better corrosion-resistant against e.g. acids, bases and seawater.

Beside the main component aluminium, further components such as silicon, magnesium, manganese, copper, zinc, nickel, vanadium, lead, antimon, tin, cadmium, bismuth, titanium, chromium, iron, beryllium can be present in the alloy. These further components are present either exclusively or as mixtures among individual components. Change in the characteristics of pure aluminium metal is already achieved with minor amounts of the aforementioned components. In the majority of all cases, the total content of the additional components does not exceed 20 weight%, mostly not even 10 weight%, and in a lot of cases not more than 5 weight % of the total weight of the alloy. For obtaining extreme corrosion-resistance silicon is often added to the aluminium in an amount of up to 13 weight% of the total weight of the alloy in order to achieve an extreme corrosion resistance. This is possible since the high reflectivity of aluminium is not lessened by the presence of additional elements as long as they do not exceed approximately 20% of the total weight of the alloy. In Table 1, a selection of aluminium alloys are listed for the production of optically variable pigments by physical vapour deposition.

TABLE 1

Selection of Al-alloys suitable for the production of corrosion-resistant optically variable pigments

| Specification | Composition of the main components of the alloy weight. - % | | Allowable admixture in weight % | |
|---|---|---|---|---|
| AlMn | Mn | 0,1–1,4 | Si | 0,5 |
| | Mg | 0,0–0,3 | Fe | 0,6 |
| | Al | rest | Cu | 0,1 |
| | | | Cr | 0,05 |
| | | | Zn | 0,2 |
| | | | Ti | 0,1 |
| | | | Others individual | 0,05 |
| | | | sum. | 0,15 |
| AlMg3 | Mg | 2,6–3,4 | Si | 0,4 |
| | Mn | 0,5–1,1 | Fe | 0,4 |

TABLE 1-continued

Selection of Al-alloys suitable for the production of corrosion-resistant optically variable pigments

| Specification | Composition of the main components of the alloy weight. - % | | Allowable admixture in weight % | |
|---|---|---|---|---|
| | Cr | 0–0,3 | Cu | 0,05 |
| | Al | rest | Zn | 0,2 |
| | | | Ti | 0,1 |
| | | | Others individual | 0,05 |
| | | | sum. | 0,15 |
| AlMgMn | Mg | 1,6–2,5 | Si | 0,4 |
| | Mn | 0,5–1,1 | Fe | 0,5 |
| | Cr | 0–0,3 | Cu | 0,10 |
| | Al | rest | Zn | 0,2 |
| | | | Ti | 0,1 |
| | | | Others individual | 0,05 |
| | | | sum. | 0,15 |
| E-AlMgSi 0,5 | Mg | 0,4–0,8 | Cu | 0,05 |
| | Si | 0,35–0,7 | Mn | 0,1 |
| | Fe | 0,1–0–3 | Cr | 0,05 |
| | Al | rest | Zn | 0,2 |
| | | | Ti | 0,1 |
| | | | Others individual sum. | 0,05 |
| AlMgSi0,5 | Mg | 0,4–0,8 | Fe | 0,3 |
| | Si | 0,35–0,7 | Cu | 0,05 |
| | Al | rest | Mn | 0,1 |
| | | | Cr | 0,05 |
| | | | Zn | 0,2 |
| ALMg5 | Mg | 4.5–5.5 | | |
| | Mn | 0.0–0.4 | | |
| | Al | rest | | |
| AlMg9Si | Mg | 7.0–10.0 | | |
| | Si | 0.0–2.5 | | |
| | Mn | 0.2–0.5 | | |
| | Al | rest | | |
| AlSi12 | Si | 11.0–13.5 | | |
| | Mn | 0.0–0.4 | | |
| | Al | rest | | |
| AlMgSi 1 | Mg | 0,6–1,2 | Fe | 0,5 |
| | Si | 0,75–1,3 | Cu | 0,10 |
| | Mn | 0,4–1,0 | Zn | 0,2 |
| | Cr | 0–0,3 | Ti | 0,1 |
| | Al | rest | Others individual sum. | 0,05 0,15 |

The opaque, totally reflecting layer or layers of aluminium alloy can be produced by all of the known physical vapor deposition techniques, as long as the resultant thin-film is of the required compositional ratio. References to such processes have already listed hereinbefore. Particularly well adapted for the production of thin-films made from alloys is the deposition with the help of an energy providing electron beam. The material is evaporated in this case from a melt or a semi-melt of the alloy. Magnetron sputtering processes are suitable too.

The method for the production of optically variable pigments having a color shift between two distinct predeterminable colours comprises the subsequent steps of depositing, by physical vapor deposition, a semi-transparent, partially reflecting layer onto a flexible supporting material. This can be a web of polyethylenetherephthalate which is separable in certain liquids. On top of the semi-transparent partially reflecting layer, a dielectric layer of an appropriate thickness is deposited by physical vapor deposition, too. The sequence of partially reflecting layer and dielectric layer may optionally be repeated. The subsequent layer is the opaque, totally reflecting layer of aluminium alloy applied by physical vapor deposition, too. A symmetric or asymmetric multilayer structure of the optically variable pigment can be completed by depositing additionally sequences on both sides of the totally reflecting layer.

When the deposition process is finalized, the multilayer thin-film structure is detached from the supporting material and usually breaks up spontaneously into irregular pieces. These pieces need further processing to obtain the desired pigment size.

In a second production process an opaque totally reflecting sheet is made by physical vapor deposition of an aluminium alloy on a supporting material. After detaching the totally reflecting sheet from the supporting material the sheet is comminuted to the desired pigment size. The smooth, plane totally reflecting aluminium alloy platelets with parallel first and second surfaces are transferred to the reaction vessel for depositing the subsequent dielectric and semi-transparent partially reflecting layers by chemical vapor deposition. The resultant optically variable pigments have a chromaticity comparable to those pigments made by the first process. However, the production costs are much lower. Optically variable pigments made according to this second method have the advantage that they will withstand harsher conditions than pigments of the same type made from a pure aluminium precursor.

The optically variable pigments of the present invention can be incorporated into any kind of coating composition, printing ink or any other film forming composition. The size of the pigments in such compositions is between 5 and 100 μm. These compositions usually comprise a film-forming resin, diluents to dissolve, disperse or dilute said resin and additives such as extenders, anti-foaming-, wetting-, cross-linking agents etc.

Coating compositions or printing inks containing optically variable pigments of the present invention may be applied to any kind of substrates for decorative purposes.

In a preferred embodiment of the present invention printing inks are applied to security documents for anti-counterfeiting purposes. Since the color shift of such pigments is not reproducible by photocopying machines, indicia printed with optically variable pigments provide the document with a strong security element. This is especially useful for authentication of banknotes, cheques, etc. It is important for such a security feature, especially on banknotes, that it is able to withstand severe conditions, of tropical humidity, transpiration and, given the case, even laundry.

In a preferred embodiment of the present invention the corrosion-resistant optically variable pigments are applicable in water-based printing inks or coating compositions.

After application of the coating composition or printing ink as a wet layer, the layer dries by evaporation and/or penetration of the liquids and/or by crosslinking of the film-forming binder or binders.

Optically variable pigments of the present invention can be mixed with any other kind of interference or non-interference pigments in order to modify the color or control the brightness of the resulting pigments or coating. Such non-interferance pigments can include aluminium pigments, carbon black, titanium dioxide, transparent and non-transparent dyes, transparent pigments, etc. Also all kinds of lustre pigments and particular interference pigments can be mixed with the pigments of the present invention to achieve special color characteristics.

Printing inks having incorporated optically variable pigments of the present invention can be applied to a substrate by any of the known printing techniques, preferably by silk screen, offset, flexo, letterpress, gravure particularly intaglio printing.

Figure 2:
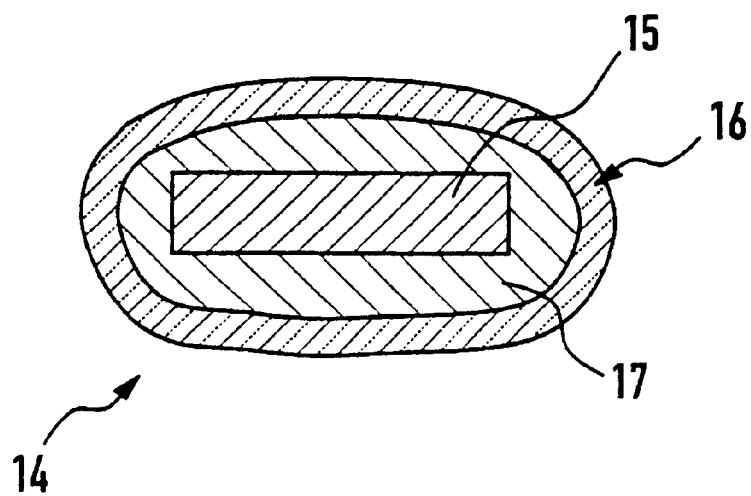

The present invention is further described in accordance with the following drawings:

FIG. 1 is a cross-sectional view of the corrosion-resistant optically variable pigment having a viewing angle dependent color shift between two distinct colours produced in accordance with the first production process, FIG. 2 depicts a cross-sectional view of an alternative construction of a corrosion-resistant optically variable pigment produced in accordance with the second production process.

The optically variable pigment 10 of FIG. 1 has irregularly broken edges 11 perpendicular to the plane of the layers P. It consists of a symmetric multilayer thin-film stack in which the two outer layers 12 are semi-transparent, partially reflecting layers made of chromium in a thickness of 20 nm. The subsequent layers 13 are of the dielectric material $MgF_2$ in a thickness of 300 nm. The central opaque layer 11 is formed of an aluminium alloy and is totally reflecting. This layer has a thickness of 60 nm. The alloy is an aluminium-silicon eutectic containing about 11.7% of silicon and 88.3% of aluminium by weight. All layers of the multilayer stack are deposited by physical vapor deposition. The pigment can be coated by additional protective transparent layers.

FIG. 2 shows the alternative construction of an optically variable pigment 14. A platelet 15 of aluminium alloy made from AlMg3 (Mg 3.5%, Mn 0.5%, Al 96%)by physical vapor deposition followed by a grinding process is coated all around with a dielectric layer 17 of $MgF_2$ in a thickness of 400 nm. A semi-transparent partially reflecting layer 16 is deposited on top of the dielectric layer 17, whereby this layer forms a coherent thin-film all around the dielectric layer 17. The dielectric layer 17 and the semi-transparent, partially reflecting layer 16 are deposited by chemical vapor deposition.

What is claimed is:

1. Optically variable pigments having a color shift between two distinct predetermined colors said optically variable pigment comprising a multilayer thin-film interference stack having first and second substantially parallel planar surfaces, said multilayer stack including an opaque totally reflecting layer having first and second substantially planar surfaces being substantially parallel to the first and second parallel planar surfaces of the multilayer stack and at least one sequence disposed on one of said first and second surfaces of the opaque totally reflecting layer, each sequence being comprised of a dielectric layer with an index of refraction of 1.65 or less and a semi-transparent partially reflecting layer with the dielectric layer of said sequence being first disposed on the totally reflecting layer, wherein the totally reflecting layer is made of a corrosion-resistant aluminum alloy by physical vapor deposition.

2. Optically variable pigments having a color shift between two distinct colors, said optically variable pigments comprising a multilayer thin-film interference stack including an opaque totally reflecting layer made from a corrosion-resistant aluminum alloy by physical vapor deposition, said opaque totally reflecting layer having disposed all around at least one period being comprised of a dielectric layer with an index of refraction of 1.65 or less and a semi-transparent, partially reflecting layer with the dielectric layer being first disposed on the totally reflecting layer.

3. Optically variable pigments according to claim 1, wherein the aluminum alloy contains, in addition to aluminum as further components one or more of the elements selected from the group consisting of silicon, magnesium, manganese, copper, zinc, nickel, vanadium, lead, antimony, tin, cadmium, bismuth, titanium, chromium, iron, beryllium.

4. Optically variable pigments according to claim 3, wherein the total content of the further components is not more than 20 weight % of the total weight of the alloy.

5. Optically variable pigments according to claim 2, wherein the aluminum, as further components one or more of the elements selected from the group consisting of silicon, magnesium, manganese, cooper, zinc, nickel, vanadium, lead, antimony, tin, cadmium, bismuth, titanium, chromium, iron, beryllium.

6. Optically variable pigments according to claim 5, wherein the total content of the further components is not more than 20 weight % of the total weight of the alloy.

7. Optically variable coating composition providing a color shift between two distinct predetermined colors, said coating composition comprising at least one film forming binder, liquids or mixture of liquids to disperse, emulsify or dissolve said binder and optically variable pigments having a color shift between two distinct colors and comprising a multilayer thin-film interference stack including a totally reflecting layer made from a corrosion-resistant aluminum alloy by physical vapor deposition.

8. Optically variable coating composition according to claim 7, wherein the aluminum alloy contains, in addition to aluminum, as further components one or more of the elements selected from the group consisting of silicon, magnesium, manganese, copper, zinc, nickel, vanadium, lead, antimony, tin, cadmium, bismuth, titanium, chromium, iron, beryllium.

9. Optically variable coating composition according to claim 8, wherein the total content of the further components is not more than 20 weight % of the total weight of the alloy.

10. Optically variable coating composition according to claim 7, wherein at least one of the liquids is water.

11. A security document having a first and a second surface wherein a least a part of at least one of said surfaces carries indicia applied with a coating composition according to claim 7.

12. Method for the production of optically variable pigments providing a color shift between two distinct predeterminable colors comprising the steps of
   a) providing a carrier material;
   b) depositing subsequent layers onto this carrier to form a multilayer thin-film interference stack having first and second substantially parallel planer surfaces, said interference stack including an opaque totally reflecting layer having first and second substantially planar surfaces parallel to the first and second parallel planar surfaces of the multilayer stack and at least one sequence disposed on one of said first and second surfaces of the totally reflecting layer, each sequence being comprised of a dielectric layer with an index of refraction of 1.65 or less and a semi-transparent partially reflecting layer with the dielectric layer of said sequence being first deposited on the opaque totally reflecting layer, whereby the opaque totally reflecting layer is formed from a corrosion-resistant aluminum alloy by physical vapor deposition;
   c) separating said multilayer stack from the carrier material;
   d) comminuting said multilayer stack to a predetermined pigment size.

13. Method for the production of optically variable pigments providing a color shift between two distinct predeterminable colors comprising the steps of
   a) providing an opaque totally reflecting layer made from a corrosion-resistance aluminum alloy by physical vapor deposition;
   b) comminuting said opaque totally reflecting layer to platelets of the desired pigment size;
   c) depositing at least one sequence of layers all around the opaque totally reflecting platelet by chemical vapor deposition said sequence being comprised of a dielectric layer with an index of refraction of 1.65 or less and a semi-transparent, partially reflecting layer with the dielectric layer being first deposited on the totally reflecting layer.

14. Method for the production of an optically variable coating composition for obtaining a color shift between two distinct predeterminable colors comprising the step of incorporating optically variable pigments having been produced by a method according to claim 12 into a coating composition comprising at least one film forming binder and liquids or mixture of liquids to dissolve, emulsify or disperse said binder.

15. Method according to claim 14, wherein the coating composition is a printing ink.

16. Method for the production of an optically variable coating composition for obtaining a color shift between two distinct predeterminable colors comprising the step of incorporating optically variable pigments having been produced by a method according to claim 13 into a coating composition comprising at least one film forming binder and liquids or mixture of liquids to dissolve, emulsify or disperse said binder.

17. Method for the production of an optically variable indicia providing a color shift between two predeterminable distinct colors comprising the steps of
   a) providing optically variable pigments having a color shift between two predeterminable colors including a totally reflecting layer made of corrosion-resistant aluminum alloy by physical vapor deposition,
   b) incorporating pigments obtained in step (a) into a coating composition, which comprises a film forming binder and liquids or mixture of liquids to dissolve, disperse or emulsify said binder;
   c) applying said printing ink obtained in step (b) to a suitable substrate to form an indicia thereupon; and
   d) hardening said image obtained in step (c) by evaporation and/or penetration of the solvent into the support and/or by crosslinking and/or coalescing of the binder.

18. The method of claim 17, wherein said substrate is a security document.

19. The method of claim 17, wherein the coating composition is a printing ink vehicle.

20. Optically variable pigments according to claim 3, wherein the total content of the further components is not more than 10 weight % of the total weight of the alloy.

21. Optically variable pigments according to claim 3, wherein the total content of the further components is not more than 5 weight % of the total weight of the alloy.

22. Optically variable pigments according to claim 5, wherein the total content of the further components is not more than 10 weight % of the total weight of the alloy.

23. Optically variable pigments according to claim 5, wherein the total content of the further components is not more than 5 weight % of the total weight of the alloy.

24. Optically variable coating composition according to claim 8, wherein the total content of the further components is not more than 10 weight % of the total weight of the alloy.

25. Optically variable coating composition according to claim 8, wherein the total content of the further components is not more than 5 weight % of the total weight of the alloy.

26. A security document according to claim 11, wherein said coating composition is a printing ink.

* * * * *